United States Patent
Ohyama

[11] Patent Number: 6,067,337
[45] Date of Patent: May 23, 2000

[54] MULTIPLE-SHEATHED SODIUM LEAKAGE DETECTION APPARATUS

[75] Inventor: Nobumi Ohyama, Oarai-machi, Japan

[73] Assignee: Doryokuro Kakunenryo Kaihatsu Jigyodan, Tokyo, Japan

[21] Appl. No.: 09/111,801

[22] Filed: Jul. 8, 1998

[30] Foreign Application Priority Data

Oct. 22, 1997 [JP] Japan .................................. 9-289940

[51] Int. Cl.$^7$ ............................. G21C 17/00; G01M 3/08
[52] U.S. Cl. ........................................ 376/253; 73/40.5 R
[58] Field of Search ................................. 376/216, 247, 376/250, 251, 253; 73/40.5 R, 49.1, 49.5, 40; 374/4, 5, 139

[56] References Cited

U.S. PATENT DOCUMENTS

| | | | |
|---|---|---|---|
| H91 | 7/1986 | Gabor et al. | 376/280 |
| 3,597,612 | 8/1971 | Boyd | 376/254 |
| 3,769,776 | 11/1973 | Berg | 95/88 |
| 3,886,444 | 5/1975 | Roy et al. | 73/19.01 |
| 3,951,738 | 4/1976 | George et al. | 376/307 |
| 3,964,293 | 6/1976 | Faure et al. | 73/40.5 A |
| 3,968,695 | 7/1976 | Weiss et al. | 73/863.11 |
| 3,969,077 | 7/1976 | Hill | 73/40.7 |
| 4,061,534 | 12/1977 | Jackson | 376/287 |
| 4,125,021 | 11/1978 | Kamei et al. | 73/304 R |
| 4,199,975 | 4/1980 | Schrock et al. | 73/40.7 |
| 4,230,526 | 10/1980 | Briggs et al. | 376/206 |
| 4,311,189 | 1/1982 | Robin | 165/11 R |
| 4,332,639 | 6/1982 | Crosgrove et al. | 376/253 |
| 4,737,338 | 4/1988 | Garabedian et al. | 376/203 |
| 5,306,441 | 4/1994 | Nazanec et al. | 204/265 |

FOREIGN PATENT DOCUMENTS

| | | |
|---|---|---|
| 356117159A | 9/1981 | Japan . |
| 0114316 | 6/1986 | Japan . |
| 1481288 | 7/1997 | United Kingdom . |

*Primary Examiner*—Michael J. Carone
*Assistant Examiner*—Fredrick T. French, III
*Attorney, Agent, or Firm*—Armstrong, Westerman, Hattori, McLeland & Naughton

[57] ABSTRACT

A multiple-sheathed sodium leakage detection apparatus capable of detecting a small amount of leakage of sodium due to a breakage of a well for temperature measurement at an early stage of the leakage. The apparatus is a combination of a multiple-sheathed sodium leakage detector having a sheathed thermocouple and sodium leakage detection element wires, which are disposed in an insulating material filled in a multiple sheath; a sodium leakage judgment device which judges whether or not there is a leakage of sodium by a signal from the multiple-sheathed sodium leakage detector; an alarm device which gives an alarm when it is judged that there is a leakage of sodium; and signal lines which connect these devices. The multiple-sheathed sodium leakage detector is designed in conformity to the sheath outer diameter so that it can be inserted into a well which has already been installed on an existing piping without changing the well.

5 Claims, 5 Drawing Sheets

Inert gas or air atmosphere

Inert gas or air atmosphere

Inert gas or air atmosphere

Inert gas or air atmosphere

Inert gas or air atmosphere 6,067,337

MULTIPLE-SHEATHED SODIUM LEAKAGE DETECTION APPARATUS

BACKGROUND OF THE INVENTION

The present invention relates to a multiple-sheathed sodium leakage detection apparatus usable in various equipment: e.g. a cooling system piping in which a well of a liquid metal-cooled fast breeder reactor is installed; a nuclear reactor vessel which is bounded by sodium through a well; various testing equipment; and plants that use an electrically conductive fluid.

Sodium is used as coolant in liquid metal-cooled fast breeder reactors, sodium testing equipment, etc. To measure the temperature in the piping for sodium, a well for measuring the sodium temperature (well) is installed directly on the piping, and a thermocouple is inserted into the well, thereby measuring the sodium temperature.

FIG. 1 shows a typical conventional process instrumentation system. A well 2 for temperature measurement is welded to a sodium cooling system piping 1 in which high-temperature sodium is flowing. A sheathed thermocouple 3 is inserted in an inert gas or air atmosphere in the well 2 and connected to compensating lead wires 5 through a terminal unit 4. A detected signal is sent to a process instrumentation system 30 of the plant.

FIG. 2 is an enlarged view showing only the part of the temperature measurement well 2 in FIG. 1. As shown in FIG. 3, which is a horizontal section view cut by the arrow A—A in FIG. 2, the sheathed thermocouple 3 has its element wires 7 disposed in an insulating material filled in a sheath. In the terminal unit 4, the thermocouple element wires 7 and the compensating lead wires 5 are connected together at a wire connection part 6. It should be noted that reference numeral 8 denotes a hot junction of the thermocouple element wires 7.

The conventional sheathed thermocouple of the type described above is an MI cable in which: the sheath material is, for example, SUS316; the thermocouple element wires are a combination of alumel and chromel wires; and the insulating material is magnesium oxide.

Incidentally, the above-described well is caused to vibrate at a portion thereof inserted in the sodium piping 1 by Karman vortex due to the flow of sodium in the piping 1. If the well is not very strong in structure, the vibration may cause the well to break. If the well is broken, sodium in the piping may leak to the outside of the piping through the well. In the case of a well such as that shown in FIGS. 1 to 3, however, when a small amount of sodium leaks out of the sodium piping into the well, it is difficult to detect the leakage of sodium from only a temperature change at the hot junction 8 of the thermocouple element wires isolated in the sheath.

Thus, it is technically difficult in the present art to discover leakage of sodium at the instant when a small amount of sodium has leaked into the well, and there is no effective means to detect a leakage of sodium at an early stage of the leakage when the well welded to the sodium piping is broken by the fluid vibration or the like. Accordingly, it has been demanded to develop a detection apparatus for discovering a small amount of sodium leakage in the well due to a breakage of the well at an early stage of the leakage.

SUMMARY OF THE INVENTION

The present invention has been made to solve the above-described problems, and an object of the invention is to provide a multiple-sheathed sodium leakage detection apparatus whereby a sodium (or an electrically conductive fluid) leakage accident due to a breakage of a well for temperature measurement is detected at an early stage of the leakage, and an appropriate plant control is carried out before the accident becomes serious, thereby minimizing an influence on nuclear reactor facilities or the like, an influence on the external environments, and an influence on society, and thus enabling the damage to be minimized.

The multiple-sheathed sodium leakage detection apparatus according to the present invention is characterized by comprising the combination of a multiple-sheathed sodium leakage detector having a sheathed thermocouple and sodium leakage detection element wires, which are disposed in an insulating material filled in a multiple sheath; a sodium leakage judgment device which judges whether or not there is a leakage of sodium by a signal from the multiple-sheathed sodium leakage detector; an alarm device which gives an alarm when it is judged that there is a leakage of sodium; and signal lines which connect these devices. The multiple-sheathed sodium leakage detector is designed in conformity to the sheath outer diameter so that it can be inserted into a well which has already been installed on an existing piping without changing the well. Thus, sodium in the piping can be put away in an exclusive tank or the like before it leaks out of the piping. Accordingly, it is possible to prevent a large-scale leakage accident in a plant.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the present invention will be described below.

Figure 4:
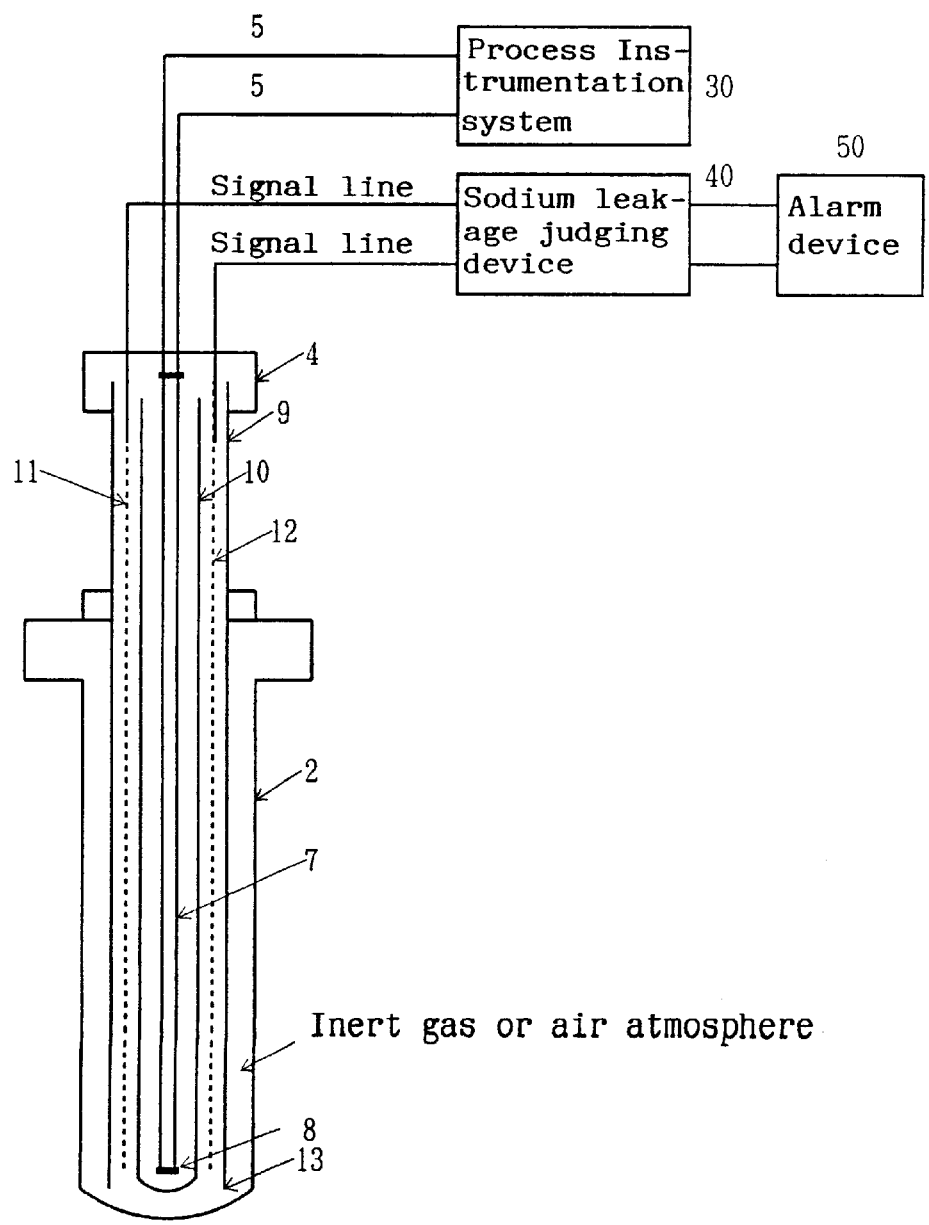
FIG. 4 is a diagram showing an embodiment of the multiple-sheathed sodium leakage detection apparatus according to the present invention.
Figure 5:
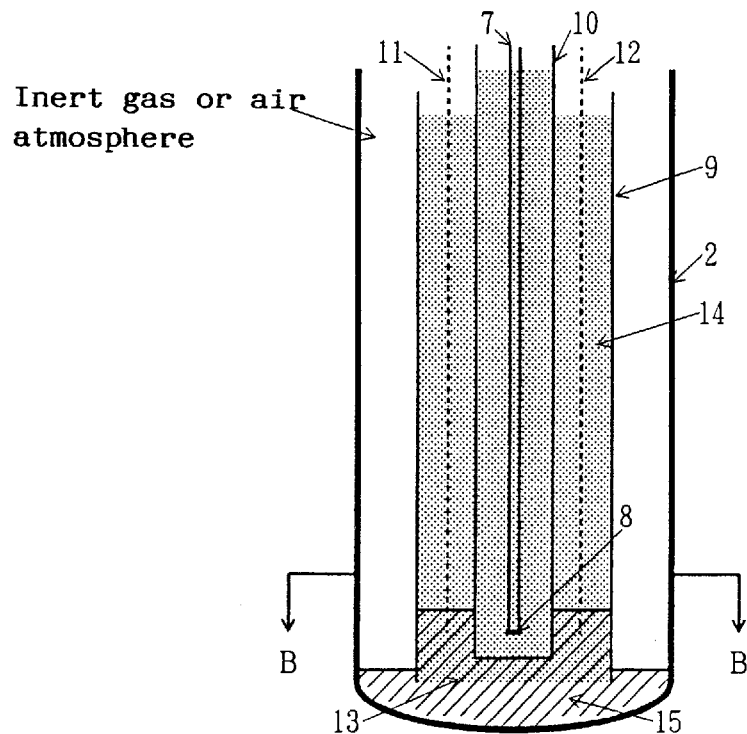
FIG. 5 is a detailed view of the apparatus shown in FIG. 4.
Figure 6:
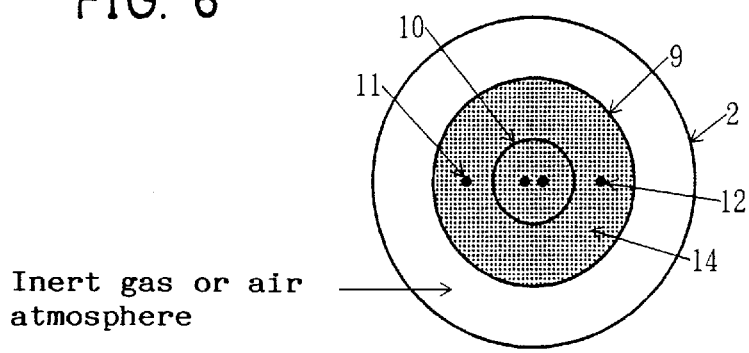
FIG. 6 is a horizontal section view cut by the arrow B—B in FIG. 5.
Figure 7:
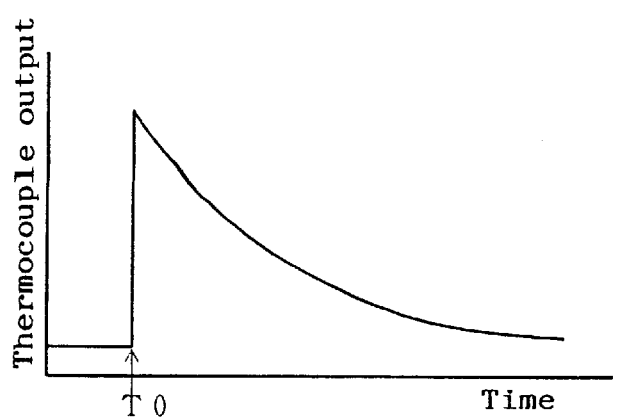
FIG. 7 is a diagram showing the thermocouple output.

FIG. 4 is a diagram showing an embodiment of the multiple-sheathed sodium leakage detection apparatus according to the present invention. FIG. 5 is a detailed view of the apparatus shown in FIG. 4. FIG. 6 is a horizontal section view cut by the arrow B—B in FIG. 5. FIG. 7 is a diagram showing the thermocouple output. It should be noted that the same reference numerals as those in FIGS. 1 and 2 denote the same matters.

Figure 1:
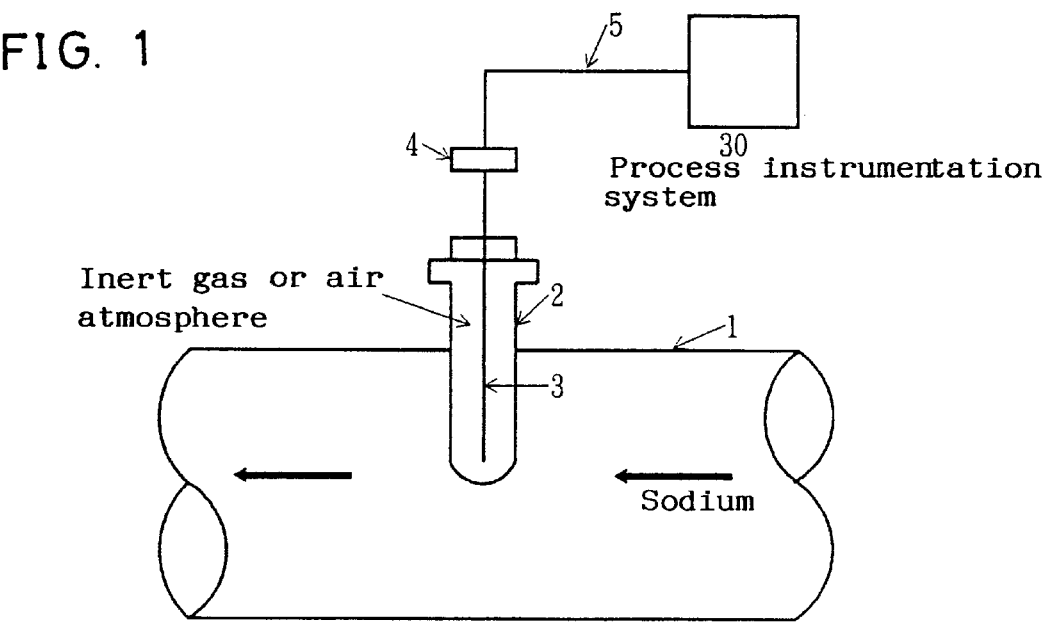
FIG. 1 is a diagram showing a typical conventional process instrumentation system.
Figure 2:
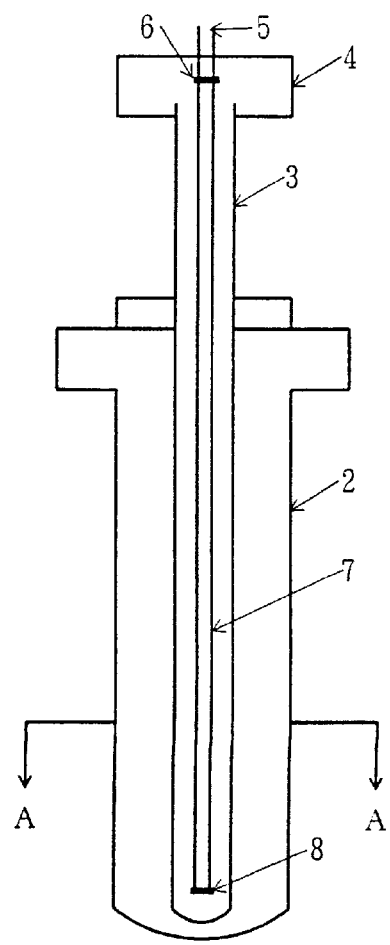
FIG. 2 is a detailed view of a conventional well for temperature measurement.
Figure 3:
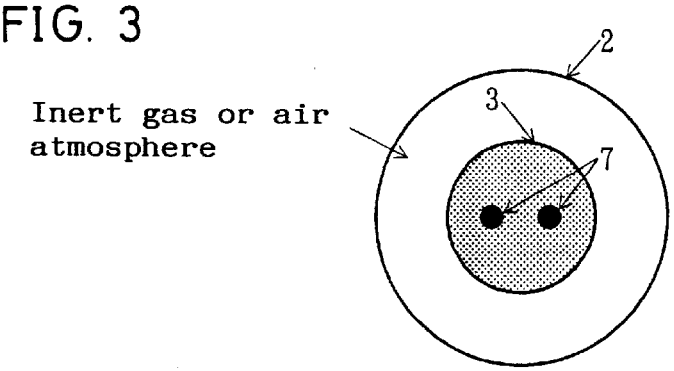
FIG. 3 is a horizontal section view cut by the arrow A—A of the well shown in FIG. 2.

A well 2 is welded to a sodium cooling system piping as shown in FIG. 1. The well 2 includes a multiple sheath having a conventional sheathed thermocouple and sodium leakage detection element wires, which are provided therein so that when sodium leaking from the piping enters the well 2, it can be detected immediately. Thus, the well 2 is arranged to be capable of temperature measurement as an essential function thereof and also capable of detecting sodium leakage.

A multiple sheath 9 is a cylindrical tube, the distal end of which is open. The constituent material of the multiple sheath 9 is SUS316. A sheathed thermocouple 10 and sodium leakage detection element wires are disposed in the multiple sheath 9. The sheathed thermocouple 10 is a conventional thermocouple formed from alumel and chromel element wires. The sodium leakage detection element wires are a combination of an alumel wire 11 and a chromel wire 12, which are thermocouple element wires. The multiple sheath 9 is filled with an insulating material 14 consisting essentially of magnesium oxide. The distal ends of the element wires 11 and 12 are positioned inside the distal end 13 of the multiple sheath 9 and electrically isolated by the insulating material under normal circumstances.

As shown in FIG. 5, if the well 2 is broken and sodium 15 leaks into the well 2, the leaking sodium 15 penetrates into the insulating material 14 (see the hatched portion in the figure) because the distal end 13 of the multiple sheath 9 is open. Consequently, the distal ends of the alumel and chromel wires 11 and 12, which are leakage detection element wires, are electrically shorted by the sodium 15 penetrating through the insulating material 14 to form a hot junction. As a result, the alumel wire 11 and the chromel wire 12 function as a thermocouple. Thus, a thermocouple output which is proportional to the atmosphere temperature is obtained. As shown in FIG. 7, the thermocouple output (leakage occurs at time T0) shows characteristics in which it gradually lowers with time. More specifically, the sodium 15 penetrates through the insulating material 14 in the multiple sheath with time. When the sodium 15 penetrates to such an extent that the multiple sheath reaches about 100° C., the sodium 15 solidifies and does not penetrate any longer. At some stage before the sodium 15 solidifies, the alumel wire 11 and the chromel wire 12 form a hot junction through the sodium, and the hot junction moves in the multiple sheath 9 with time toward a side where the temperature is lower.

The thermocouple output generated in the multiple-sheathed sodium leakage detector is inputted to a sodium leakage judgment device 40 shown in FIG. 4. By detecting the output, the sodium leakage judgment device 40 detects that the sodium 15 enters the well 2 on account of a breakage of the well 2, and activates an alarm device 50. Thus, it is also possible to drain sodium from the sodium piping automatically by using the detected signal. Further, by alarming a plant operator about the occurrence of an abnormality, the plant can be controlled at an early stage before sodium leaks to the outside of the sodium piping. Consequently, damage due to the leakage of sodium can be minimized.

Figure 9:
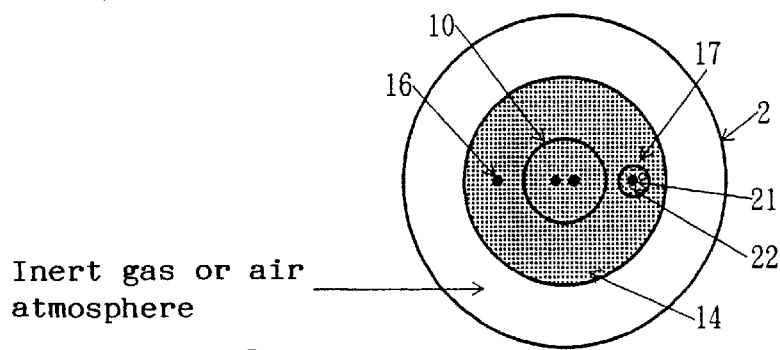
FIG. 9 is a horizontal section view cut by the arrow C—C in FIG. 8.
Figure 10:
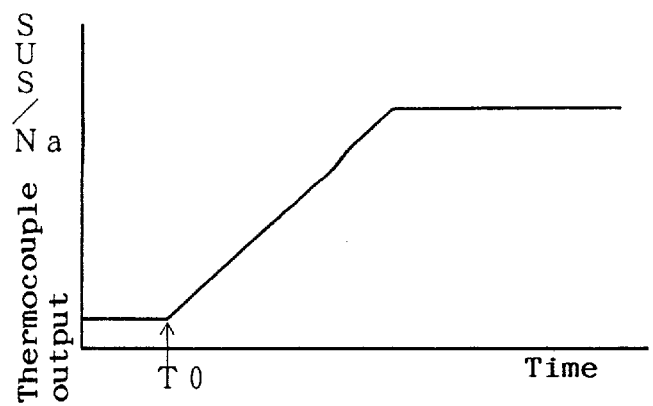
FIG. 10 is a diagram showing the thermocouple output.

Next, another embodiment of the present invention will be described with reference to FIGS. 8 to 10.

Figure 8:
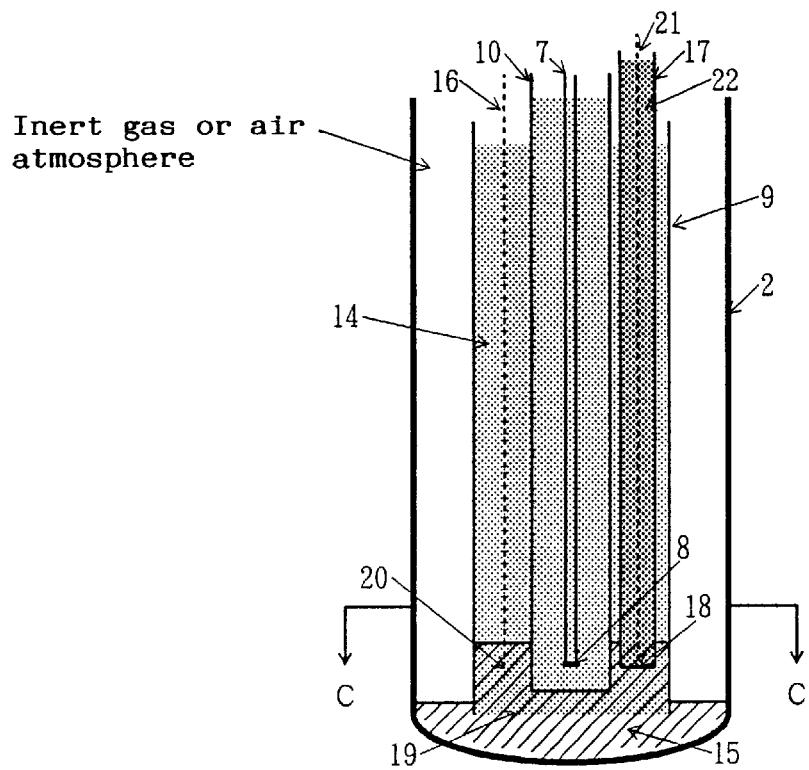
FIG. 8 is a diagram showing another embodiment of the multiple-sheathed sodium leakage detection apparatus according to the present invention.

FIG. 8 is a diagram showing another embodiment of the multiple-sheathed sodium leakage detection apparatus according to the present invention. FIG. 9 is a horizontal section view cut by the arrow C—C in FIG. 8. FIG. 10 is a diagram showing the thermocouple output.

In FIG. 8, stainless steel (SUS316) and sodium are used as metallic materials constituting a thermocouple. That is, a stainless steel element wire 16 is used as one of the thermocouple element wires as shown in FIGS. 4 and 5, and a similar stainless steel element wire 21 is used as the other thermocouple element wire. The stainless steel element wire 21 is covered with a sheath 17 of the same material as that of the element wire 21. The element wire 21 and the sheath 17 are isolated by an insulating material 22. The distal ends of the sheath 17 and the stainless steel element wire 21 are electrically connected (at a joint 18).

In this embodiment, if sodium 15 enters the well 9 and accumulates at the bottom of the well, the sodium 15 penetrates into the insulating material 14 from an open portion of the distal end 19 of the multiple sheath. Consequently, the stainless steel element wire 16 and the sodium 15 constitute a thermocouple, and a thermoelectromotive force V1 is generated between the sodium 15 and the stainless steel element wire 16. The other sheathed stainless steel element wire 21 forms at the distal end thereof a thermocouple of the sodium 15 and the stainless steel element wire 21. In this thermocouple also, a thermoelectromotive force V2 is generated between the sodium 15 and the stainless steel element wire 21 in the sheath. The thermocouple output used in the sodium leakage detector is an electric potential difference between the output from one stainless steel element wire and the output from the other sheathed stainless steel element wire (V2−V1). A leakage of sodium is detected from the potential difference (V2−V1). The potential difference is such as that shown in FIG. 10. The output voltage shows a tendency to increase gradually with passage of time from the instant when a potential difference is formed (leakage occurs at time T0). More specifically, the position a hot junction 20 of the stainless steel element wire 16 and the sodium 15 moves toward a side where the temperature is lower as the sodium 15 penetrates through the insulating material 14. Therefore, the thermoelectromotive force V1 gradually lowers and eventually becomes constant when the leaking sodium moving toward the low-temperature side solidifies. The other stainless steel element wire 21, which is inserted into the sheath 17, is electrically connected to the sheath 17 at the distal end 18 of the sheath 17. Therefore, this portion forms a hot junction, and this is independent of the sodium 15 penetrating through the multiple sheath 9. Thus, a constant thermocouple output V2 which is proportional to the temperature in the vicinity of the hot junction is obtained. Accordingly, the output (V2−V1) gradually increases and thereafter becomes constant as shown by the characteristic curve in FIG. 10. The potential difference is detected by the above-described sodium leakage judgment device 40. In this embodiment, the structure of the apparatus may be such that the other stainless steel element wire 21 is inserted into the thermocouple sheath 17, together with the thermocouple 7, and the distal end of the element wire 21 is electrically connected to the thermocouple sheath 17.

Figure 11:
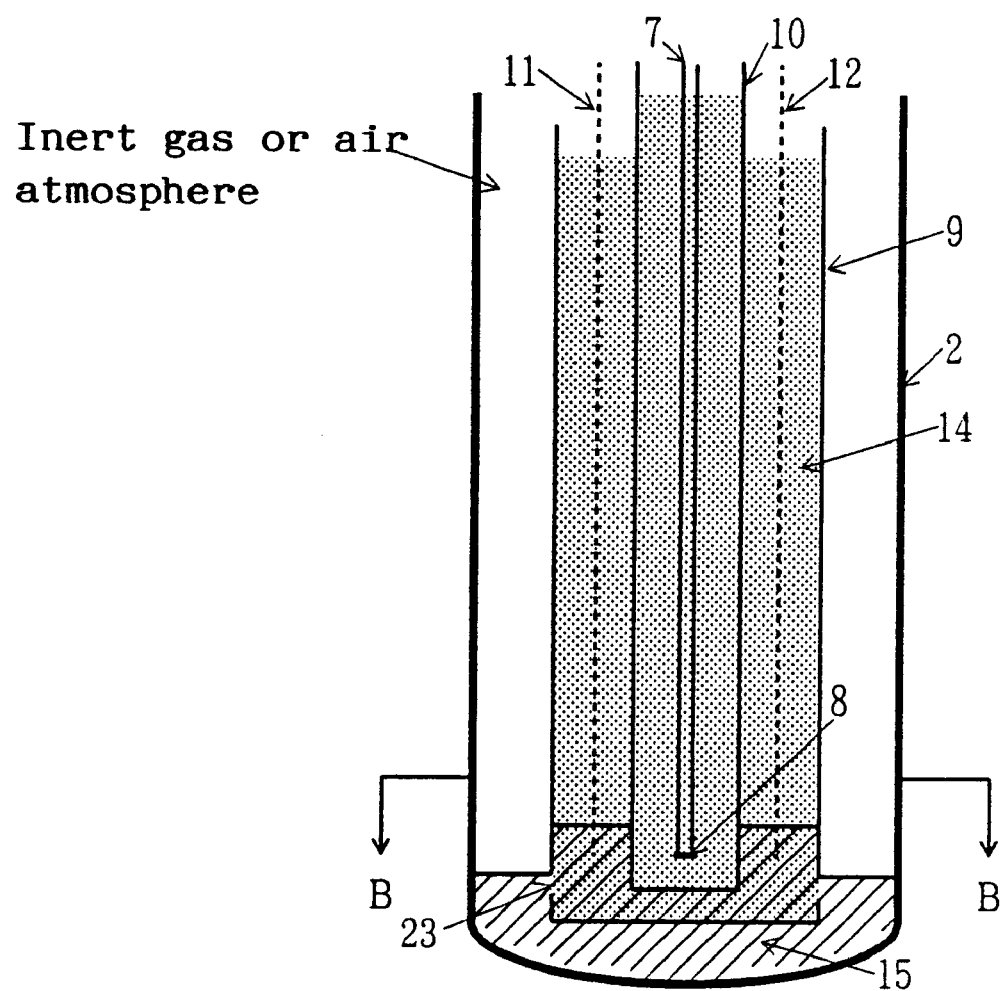
FIG. 11 is a diagram showing another embodiment of the multiple-sheathed sodium leakage detection apparatus according to the present invention.

FIG. 11 is a diagram showing another embodiment of the present invention.

The configuration of the distal end of the multiple sheath is not necessarily limited to those shown in FIGS. 5 and 8, in which the distal end is open. The structure of the multiple sheath may also be as follows. As shown in FIG. 11, the distal end of the multiple sheath 9 is closed by welding using the same material as the metallic material constituting the outer side of the multiple sheath 9, and a hole 23 is bored in a side of the multiple sheath 9 such that leaking sodium penetrates through the hole 23 into the multiple sheath 9.

Further, it is possible to combine together a plurality of structures designed as stated above. Besides the scheme of forming a thermocouple by sodium, it is possible to employ a method wherein a voltage is applied between one element wire and the other element wire from the sodium leakage judgment device, and when the two element wires begin to conduct electrically, the sodium leakage judgment device judges that there is a leakage and gives an alarm.

As has been stated above, according to the present invention, when a crack is developed in a well that is bounded by sodium used as coolant and a small amount of sodium enters the well, the leakage can be detected early. Therefore, it is possible to carry out a plant control, for example, draining of sodium from the cooling piping, with the leakage confined within the well. As a result, it is possible to minimize damage to the equipment due to sodium leaking out of the piping.

What we claim is:

1. A multiple-sheathed sodium leakage detection apparatus comprising:

a multiple-sheathed sodium leakage detector containing a sheathed thermocouple and contact type sodium leakage detection element wires which electrically conduct by contact with leaking sodium, said sheathed thermocouple and said sodium leakage detection element wires being disposed in an insulating material filled in a multiple sheath;

a sodium leakage judgment device which detects a sodium leakage signal from the multiple-sheathed sodium leakage detector and judges whether or not there is a leakage of sodium; and an alarm device which gives an alarm when it is judged that there is a leakage of sodium;

whereby it is possible to measure a sodium temperature and to detect a leakage of sodium.

2. A multiple-sheathed sodium leakage detection apparatus according to claim 1, wherein the sodium leakage detection element wires electrically conduct by contact with electrically conductive sodium penetrating through the insulating material from an open end of the multiple-sheathed sodium leakage detector.

3. A multiple-sheathed sodium leakage detection apparatus according to claim 2, wherein said sodium leakage detection element wires are metal wires of different kinds of materials, and when electrically conducting, said metal wires of different kinds form one or a plurality of thermocouples.

4. A multiple-sheathed sodium leakage detection apparatus according to claim 3, wherein said sodium leakage detection element wires further include stainless steel wires, and said stainless steel wires form one or a plurality of stainless steel-sodium thermocouples by contact with electrically conductive sodium.

5. A multiple-sheathed sodium leakage detection apparatus according to claim 2, wherein said sodium leakage detection element wires are stainless steel wires, and said stainless steel wires form one or a plurality of stainless steel-sodium thermocouples by contact with electrically conductive sodium.

* * * * *